United States Patent [19]

Chacon et al.

[11] Patent Number: 4,915,422
[45] Date of Patent: Apr. 10, 1990

[54] PIPE COUPLING

[75] Inventors: Michael Chacon, Pleasanton; Clifford Cooper; Michael Herrell, both of Oakland; John Fehringer, San Mateo; Daniel Nunes, San Leandro; Joseph Panek, Concord; Theodore Ray, San Leandro; Anthony Sumida, Alameda; Clifford Wixson, Castro Valley, all of Calif.

[73] Assignee: The American Brass & Iron Foundry, San Leandro, Calif.

[21] Appl. No.: 294,151

[22] Filed: Jan. 6, 1989

[51] Int. Cl.$^4$ .............................................. F16L 21/02
[52] U.S. Cl. ...................................... 285/39; 285/110; 285/369; 277/207 A; 29/237
[58] Field of Search .................... 285/369, 39, 5, 110, 285/230; 29/237; 254/29 R; 277/207 A, 209

[56] References Cited

U.S. PATENT DOCUMENTS

| | | |
|---|---|---|
| 889,315 | 6/1908 | Kenyon . |
| 1,504,363 | 8/1924 | Madigan ........................... 285/39 X |
| 1,587,689 | 6/1926 | Weiss et al. . |
| 2,032,492 | 3/1936 | Nathan ................................ 277/209 |
| 2,900,200 | 8/1959 | Umstadter ...................... 285/369 X |
| 3,081,102 | 3/1963 | Murray et al. .............. 277/207 AX |
| 3,096,572 | 7/1963 | Simmons . |
| 3,163,432 | 12/1964 | DeBoer ......................... 285/110 X |
| 3,386,745 | 6/1968 | Hein ............................. 277/207 AX |
| 3,387,864 | 6/1968 | Walters . |
| 3,521,912 | 7/1970 | Maurer ......................... 285/369 X |
| 3,573,871 | 4/1971 | Warner ......................... 285/110 X |
| 3,578,805 | 5/1971 | Dutton ......................... 285/369 X |
| 3,653,115 | 4/1972 | Perkins . |
| 3,682,503 | 8/1972 | Bloom . |
| 3,710,427 | 1/1973 | Doty . |
| 3,988,819 | 11/1976 | Sato . |
| 3,998,478 | 12/1976 | Zopfi ............................. 285/369 X |
| 4,018,461 | 4/1977 | Bram ............................. 285/369 X |
| 4,174,125 | 11/1979 | Wyss ............................. 285/369 X |
| 4,206,938 | 6/1980 | Bartell ............................ 285/5 X |
| 4,371,179 | 2/1983 | Bohman ....................... 285/110 X |
| 4,519,122 | 5/1985 | Miller ............................... 29/237 |

FOREIGN PATENT DOCUMENTS

| | | | |
|---|---|---|---|
| M018576 | 6/1956 | Fed. Rep. of Germany ........... 285/5 |
| 61978 | 1/1940 | Norway ............................. 277/207 A |
| 1083451 | 9/1967 | United Kingdom ................. 285/110 |

Primary Examiner—Thomas F. Callaghan
Attorney, Agent, or Firm—Townsend and Townsend

[57] ABSTRACT

A joint to be used with a coupling tool for coupling first and second axially aligned hubless pipe end sections. The joint includes an outer sleeve and an inner liner disposed within the outer sleeve. A pair of diametrically opposed cylindrically shaped lugs are positioned on the outer surface of the outer sleeve. The axis of each lug is oriented perpendicularly to the longitudinal axis of the outer sleeve for mating engagement with a slot formed in the coupling tool. The pipe end sections are retained by compression of the liner in abutting relationship with a lip formed on the interior surface of the outer sleeve. The lugs are positioned equidistant from the axial ends of the outer sleeve for insertion of the pipe end sections easily within either axial end of the sleeve.

5 Claims, 2 Drawing Sheets

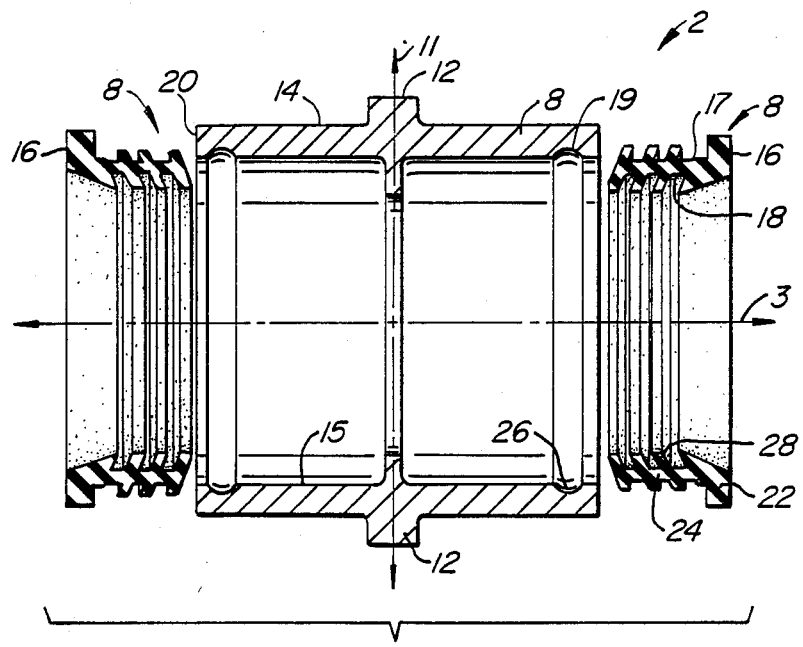
FIG._3.
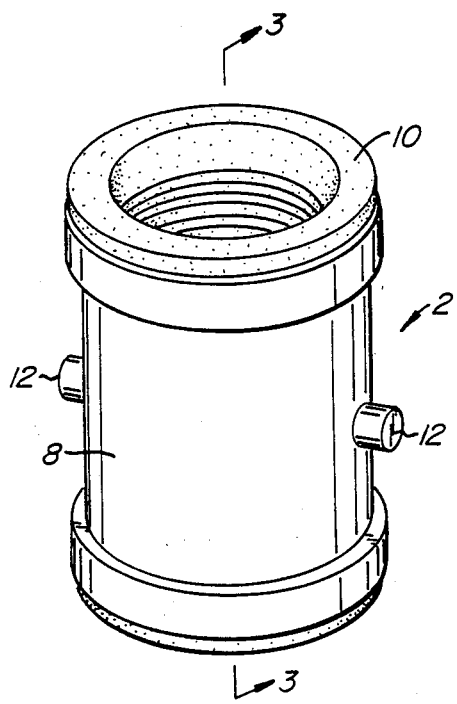
FIG._1.
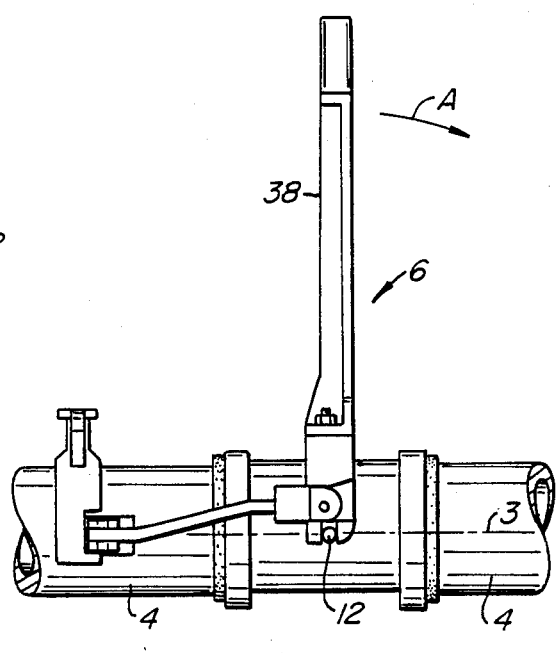
FIG._2.

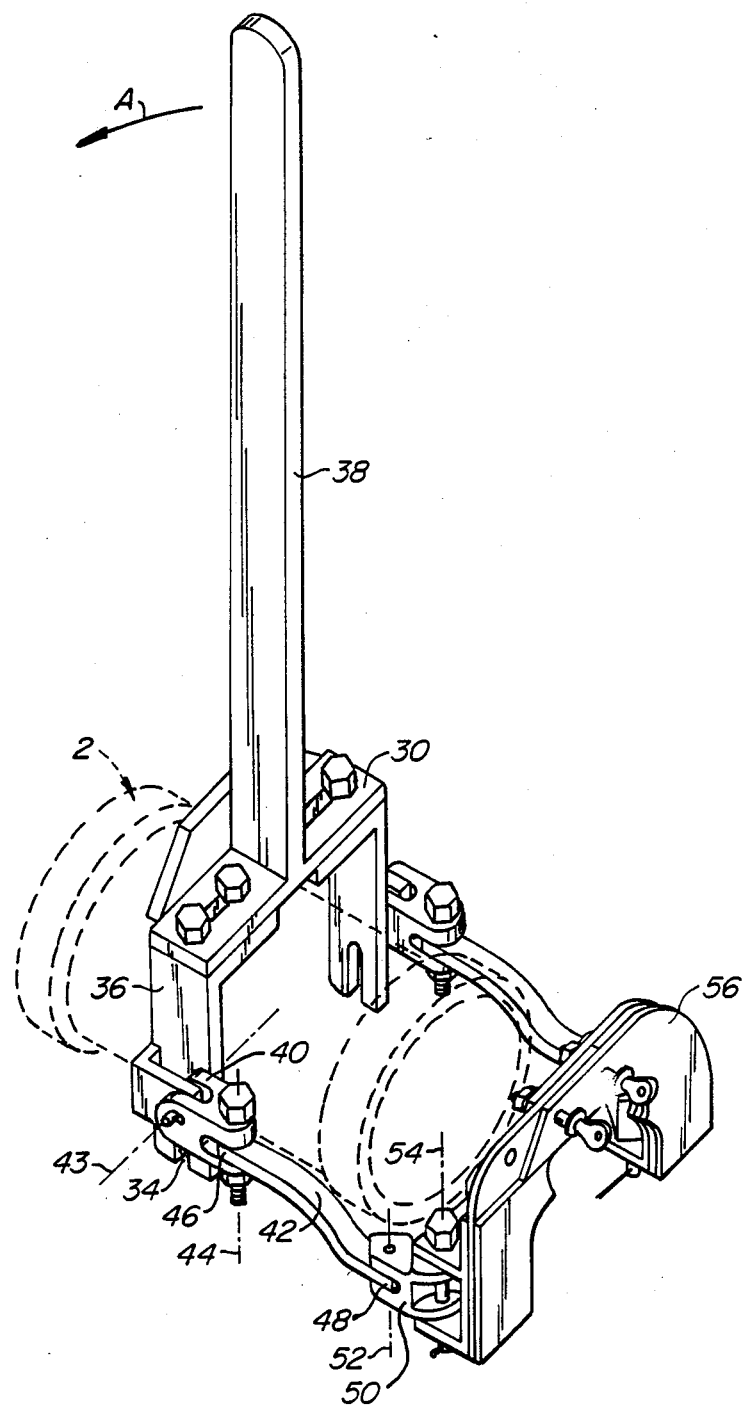
FIG._4.

PIPE COUPLING

BACKGROUND OF THE INVENTION

1. Field of the Invention

This invention relates to a pipe coupling for joining axially aligned pipe sections.

Axially aligned pipes conventionally include a hub at one end for mating engagement with the opposite end of a similar piece of pipe. This conventional arrangement requires proper orientation of the pipe sections for sealing within the hub of the consecutive pipe section.

More recently, it has been found desirable to use hubless pipes because they are economical to manufacture and readily enable proper orientation with respect to each other. However, assembly of hubless pipes requires considerable precise axial force, without lateral force, to ensure proper sealing. Therefore, it is necessary to utilize a specialized tool for providing adequate mechanical advantage when assembling the pipe sections.

2. Description of the Prior Art

U.S. Pat. No. 3,682,503 to Bloom discloses a pipe joint for hubless pipe. The joint includes an outer sleeve and an inner gasket having a length extending beyond the overall length of the outer sleeve. Two hubless pipes are inserted into the central bore of the joint. The end faces of each pipe are urged inwardly toward a lip formed in the joint. The joint is assembled when the end faces of the pipe sections abut the lip. Although the pipe ends are inserted into the joint, Bloom provides no means by which to facilitate insertion.

U.S. Pat. No. 3,096,572 to Simmons discloses a pipe joint fabricating tool for assembling pipes having telescoping bell and spigot type joints. Each end of the assembly tool includes a jaw for maintaining engagement with the pipe during assembly. Teeth are provided at each end of the jaw for gripping the outer surface of the pipe. Where insertion of the pipe into the consecutive joint section requires substantial force, the jaw may scrape along the pipe, rather than allowing insertion of the end into the joint. This may result in wear of the teeth and erosion of the pipe with no mechanical advantage for assembly.

SUMMARY OF THE INVENTION

The present invention is a pipe coupling joint which cooperates with a pipe coupling tool for coupling axially aligned pipe sections. The pipe coupling includes an outer sleeve having a pair of diametrically opposed lugs formed on the outer surface of the outer sleeve for cooperation with the pipe coupling tool.

The outer sleeve includes an inner liner for retaining consecutive pipe end sections within the sleeve. In the preferred embodiment, the inner liner is in the form of a gasket disposed at each end of the outer sleeve. Outwardly extending ribs are formed in the radially outer surface of each gasket for engagement with a groove formed on the interior surface of the outer sleeve. Inwardly extending ribs are formed on the inner radial surface of each gasket opposite the outwardly extending ribs. The inner liner is resilient such that the pipe end sections compress the inwardly extending ribs to retain the pipe by pressure within the coupling joint.

A lip may be formed on the interior surface of the outer sleeve at the longitudinal center of the sleeve. When the pipe sections are inserted into the coupling, their ends are in abutting engagement with the lip.

The lugs are positioned on the outer surface of the sleeve equidistant from the axial ends of the sleeve to allow for each of assembly of either pipe end section into the coupling joint. The lugs and lip are preferably positioned at the same location along the longitudinal axis. A slot formed in each side of the pipe coupling tool matingly engages the lugs for insertion of the pipe end sections into the joint. The lugs are preferably cylindrically shaped having an axis perpendicular to the axis of the outer sleeve.

In the preferred embodiment, the diametrically opposed lugs are formed on the outer surface of the outer sleeve for engaging the slot formed in the arms of coupling tool. This results in a coupling for hubless pipe which is economical to manufacture and provides mechanical advantage which simplifies assembly. Additionally, assembly of the coupling of the present invention does not cause undue wear of the pipe, the coupling, or the pipe coupling tool.

BRIEF DESCRIPTION OF THE DRAWINGS

FIG. 1 is a perspective view of the pipe coupling.

FIG. 2 is a side elevational view of the coupling tool engaging the pipe coupling.

FIG. 3 is an exploded view of the pipe coupling taken along line 3—3 of FIG. 1.

FIG. 4 is a perspective view of the coupling tool.

DETAILED DESCRIPTION OF THE PREFERRED EMBODIMENT

Referring now to the drawings, FIG. 2 shows a pipe coupling compression joint 2 for coupling hubless pipe end sections 4, 4 along a longitudinal axis 3 using a pipe coupling tool 6.

Pipe coupling 2 includes an outer sleeve 8 having an inner liner 10 disposed within the outer sleeve. A pair of diametrically opposed lugs 12 are positioned on the outer surface 14 of outer sleeve 8.

The inner sleeve 10 includes a first gasket 16 positioned at a first axial end 19 of outer sleeve 8 and a second gasket 16 positioned at a second axial end 20 of the outer sleeve. A rim 22 is integrally formed along a radially extending edge of each gasket 16 encasing first and second axial ends 19, 20. Each gasket 16 extends inwardly along longitudinal axis 3 from the respective axial end 19, 20 of outer sleeve 8 toward the center of the sleeve. Outwardly extending ribs 24 are formed on the outer radial surface 17 of each gasket 16 at a location longitudinally inwardly of rim 22. Ribs 24 are configured to fit within a groove 26 disposed at each axial end 19, 20 of the inner surface 15 of outer sleeve 8. Inwardly extending ribs 28 are formed on the inner radial surface 18 of each gasket 16 opposite outwardly extending ribs 24. Ribs 24 are resilient so as to securely conform to the shape of groove 26 to be retained within the groove. Inwardly extending ribs 28 are also resilient so as to retain hubless pipe end section 4 within pipe coupling compression joint 2 by exerting sufficient pressure on the pipe section, as described below.

A lip 30 is formed on interior surface 15 of outer sleeve 8 at the longitudinal center of the outer sleeve. Lip 30 extends radially inwardly in the same direction as inwardly extending ribs 28 a distance greater than that of the inwardly extending ribs. When pipe sections 4 are coupled via pipe coupling 2, their end sections are in abutting engagement with lip 30.

Lugs 12 are of cylindrical configuration having an axis 11 perpendicular to longitudinal axis 3. Lugs 12 are equidistant from axial end 19, 20. Thus, lugs 12 and lip 30 are positioned at the same longitudinal position along axis 3. Lugs 12 are positioned on outer surface 14 of outer sleeve 8 while lip 30 is positioned on interior surface 15 of outer sleeve 8.

Lugs 12 are configured so that pipe coupling 2 and pipe end sections 4 are easily manipulated by pipe coupling tool 6.

Pipe coupling tool 6 includes a yoke 32 having one slot 34 formed in each of depending ears 36. A two-way joint 40 is disposed on each depending ear 36 above slot 34. A handle 38 extends from the center of yoke 32 in a direction parallel to and opposite from depending ears 36. Handle 38 is rotatable in the direction of arrow A, pivoting yoke 32 about horizontal axis 43 of two-way joint 40. A linkage bar 42 is mounted about a vertical axis 44 of two-way joint 40 at one end 46 of linkage bar 42. A locking jaw 50 is substantially triangular in shape and is the pivotal element for insertion of pipe section 4 into coupling joint 2. The opposite end 48 of linkage bar 42 is mounted about a first axis 52 located at one apex of locking jaw 50. A second axis 54 is located at a second apex of triangularly-shaped locking jaw 50. A pipe clamp 56 is mounted about second axis 54 of locking jaw 50. Pipe clamp 56 is sized to accommodate pipe end section 4.

In operation, the insertion of hubless pipe end section 4 into pipe coupling compression joint 2 should be apparent from the above description. First axial end 18 of pipe coupling 2 is axially aligned with pipe end section 4. Pipe clamp 56 of coupling tool 6 is supported on pipe end section 4 while slots 34 of yoke 32 are fitted into lugs 12.

Handle 38 is rotated in the direction of arrow A. Pivoting of depending ears 36 results in longitudinal movement of slots 34 toward the center of pipe coupling joint 2. Two-way joint 40 pivots about horizontal axis 43, causing horizontal movement of the two-way joint. Linkage bar 42 moves longitudinally, along with two-way joint 40, pivoting slightly about vertical axis 44 of two-way joint 40 and first axis 52 of locking jaw 50. locking jaw 50 pivots about second axis 54, causing movement of pipe clamp 56 along longitudinal axis 3.

Because pipe clamp 56 is sized to tightly grasp pipe section 4, hubless end section 4 translates longitudinally with respect to pipe coupling 2, into abutting engagement with lip 30 of interior surface 15 of pipe coupling joint 2. As pipe section 4 is forced into gasket 16, inwardly extending ribs 28 are compressed, resulting in a tight seal which is maintained under pressure.

Once pipe section 4 is coupled to joint 2, pipe coupling tool 6 is removed from first axial end 18. If desired, coupling tool 6 may be repositioned such that a second axially aligned pipe section 4 may be coupled with second axial end 20 of pipe coupling joint 2.

This invention has been described with reference to the preferred embodiment. Variations and modifications can be made without departing from the scope of the present invention, which is limited only by the following claims.

We claim:

1. An article of manufacture for joining first and second axially aligned hubless pipe sections consisting of:
    a one-piece outer sleeve having an outer surface, an interior surface, first and second axial ends and a lip formed on said interior surface for abutting engagement;
    a pair of axially elongated, resilient gaskets, each disposed within respective of the first and second axial ends of said outer sleeve, each gasket having an outer surface and an inner surface, each gasket including outwardly extending ribs disposed on said outer surface engaging the interior sruface of said outer sleeve and inwardly extending ribs disposed on said inner surface for engaging respective of said pipe end sections for retaining said first pipe end section within said first axial end and said second pipe end section within said second axial end; and
    a single pair of diametrically opposed cylindrically shaped lugs positioned on said outer surface of said sleeve equidistant from said first and second axial ends and having an axis perpendicular to the axis of said outer sleever, said lugs and lip being aligned with each other along the axis of said sleeve.

2. The article of manufacture as defined by claim 1 wherein said outwardly extending ribs and said inwardly extending ribs are substantially parallel to each other.

3. The compression joint as defined by claim 1 wherein said inwardly extending ribs are compressible by the pipe end sections.

4. The compression joint as defined by claim 1 further comprising a groove formed within the outer sleeve at each axial end thereof for engaging said outwardly extending ribs to thereby retain said gasket within said sleeve.

5. The article of manufacture as defined by claim 1, wherein said pair of axially elongated gaskets each includes a rim of greater diameter than the diameter of the interior surface of said outer sleeve for abutting engagement with respective of said first and second axial ends of said outer sleeve.

* * * * *